United States Patent [19]
Nakase et al.

[11] Patent Number: 5,760,855
[45] Date of Patent: Jun. 2, 1998

[54] ACTIVE MATRIX TYPE LIQUID CRYSTAL DISPLAY PANEL HAVING A GUARD RING ELECTRICALLY CONNECTED TO THE COMMON ELECTRODE

[75] Inventors: Hirokazu Nakase, Yamatotakada; Fumio Kinosita, Takaichi-gun, both of Japan

[73] Assignee: Sharp Kabushiki Kaisha, Osaka, Japan

[21] Appl. No.: 720,593

[22] Filed: Sep. 30, 1996

[30] Foreign Application Priority Data

Oct. 3, 1995 [JP] Japan ................................ 7-256642

[51] Int. Cl.⁶ .................... G02F 1/1333; G02F 1/1345
[52] U.S. Cl. .................... 349/40; 349/149; 349/152
[58] Field of Search ........................ 349/40, 149, 152

[56] References Cited

U.S. PATENT DOCUMENTS 5,327,267  7/1994  Aoki et al. .................... 349/40
5,530,568  6/1996  Yamamoto et al. .............. 349/139

FOREIGN PATENT DOCUMENTS

04221926 A  8/1992  Japan.

Primary Examiner—William L. Sikes
Assistant Examiner—Walter Malinowski
Attorney, Agent, or Firm—David G. Conlin; David D. Lowry

[57] ABSTRACT

An active matrix type liquid crystal display panel comprises a first substrate, a second substrate, and a liquid crystal layer sandwiched by these two substrates. A plurality of gate signal lines and a plurality of source signal lines are provided on the dielectric first substrate in such a manner to intersect with each other, and thin film transistors for driving pixels are provided to the intersections of these lines individually. A short-circuit remaining line is made on the first substrate at its end portion at a predetermined distance from the end portion of each line while being electrically connected to a common electrode formed on the second substrate. This arrangement makes it possible to prevent static-induced damages to the liquid crystal display panel not only before, but also after cutting the connection between the gate and source signal lines and the short-circuit wiring provided to short-circuit these signal lines.

17 Claims, 12 Drawing Sheets

ELECTRICAL CONNECTION

ACTIVE MATRIX TYPE LIQUID CRYSTAL DISPLAY PANEL HAVING A GUARD RING ELECTRICALLY CONNECTED TO THE COMMON ELECTRODE

FIELD OF THE INVENTION

The present invention relates to an active matrix type liquid crystal display panel comprising an active matrix substrate having pixel driving elements for driving pixels thereon, an opposing substrate having a common electrode thereon, and a liquid crystal layer sandwiched by these two substrates, and to a liquid crystal display device using the above active matrix type liquid crystal display panel.

BACKGROUND OF THE INVENTION

An active matrix type liquid crystal display panel comprises an active matrix substrate, an opposing substrate, and a liquid crystal layer sandwiched by these two substrates. The active matrix substrate is a transparent dielectric substrate made of glass or the like having thereon a plurality of gate signal lines and a plurality of source signal lines intersecting with each other, pixel driving elements for driving pixels provided to the intersections of these lines individually, and pixel electrodes connected to the matrix wiring through the pixel driving elements. The opposing substrate is also a transparent dielectric substrate made of glass or the like having a film of a common electrode thereon. A TFT (Thin Film Transistor) made of amorphous silicon, an MIM (Metal Insulator Metal) element and the like are known as typical pixel driving elements. The gate signal lines, source signal lines, and common electrode are made out of a transparent electrode film, such as an ITO (Indium Tin Oxide) film.

Incidentally, static electricity is generated during the panel fabrication sequence, for example, at the rubbing step, where the orientation of liquid crystals is aligned with an orientation film, and the static electricity thus generated may cause breakdown of the pixel driving elements, which often results in characteristic defects or the like. To eliminate such static-induced damages to the liquid crystal display panel, short-circuit wiring is provided on the active matrix substrate to electrically interconnect the gate signal lines and source signal lines thereon to make the potential of each signal line equal. The short-circuit wiring is also called as a short ring circuit because it is provided in the form of a ring along the end portions of the active matrix substrate.

FIG. 10 shows example short-circuit wiring. As is shown in the drawing, short-circuit wiring 30 (shaded portion) is provided on a transparent substrate 32 at a side of its end portion to interconnect the end portions of signal lines 31 serving as the gate signal lines and source signal lines.

However, to bring the liquid crystal display panel to the commercial stage, the short-circuit wiring 30 provided to short-circuit the signal lines 31 must be cut to enable the signal lines 31 to operate separately.

When a plurality of liquid crystal panels are made out of a single transparent substrate 32, the short-circuit wiring 30 is cut at the same time when the transparent substrate 32 is cut into the liquid crystal panels. Generally, the transparent substrate 32 is cut along a cutting line 33 indicated by a long dashed line in FIG. 11 using a method, such as scribe and dicing. By so doing, the short-circuit wiring 30 is cut off together with the end portion of the transparent substrate 32 (Method ①). FIG. 13 shows a side view of the active matrix substrate after the same is cut along the cutting line 33.

Another method is disclosed in Japanese Laid-Open Patent Application No. 221926/1992 (Tokukaihei 4-221926) in which a laser beam is used to cut the short-circuit wiring as is shown in FIG. 12. To be more specific, each liquid crystal display panel is cut off from the transparent substrate 32 along a cutting line 34, or at the end surface thereof, after which the short-circuit wiring 30 is disconnected from the signal lines 31 by being cut at connecting portions 35 (crosshatched portions) with a laser beam (Method ②). FIG. 14 is a side view of the active matrix substrate after the same is cut along the cutting line 34 and the short-circuit wiring 30 is cut at the connecting portions 35 with a laser beam. In the drawing, numeral 30' denotes a short-circuit remaining line left on the substrate after the short-circuit wiring 30 is cut.

Either Method ① or ② can prevent the static-induced damages to the liquid crystal display panel during the fabrication sequence. However, neither concerns the prevention of static-induced problems after the short-circuit wiring 30 is cut. Thus, once the short-circuit wiring 30 is cut, the liquid crystal display panel again faces static-induced problems, such as element breakdown and characteristic defects caused by the element breakdown.

To be more specific, in case of Method ①, where the liquid crystal display panel is fabricated by cutting the short-circuit wiring 30 and transparent substrate 32 concurrently, the signal line 31 becomes flush with the side end surface of the panel as is shown in the cross section of the liquid crystal display panel of FIG. 15. Under these conditions, when a charger 40 withholding static electricity generated by one cause or another comes near or touches the side end surface of the panel during the fabrication sequence, the static electricity of the charger 40 is discharged into the panel through the signal line 31. Such discharge causes breakdown of the pixel driving element connected to this particular signal line 31, which results in characteristic defects. The discharge of the static electricity into the panel occurs not only when the charger 40 comes near or touches the side end surface of the panel, but also the same comes near the surface of the panel. More specifically, the static electricity flowing from the charger 40 along the surface of the liquid crystal display panel through creeping discharge may be introduced into the panel through the signal line 31 which is flush with the side end surface of the panel. In FIG. 15, numeral 37 denotes an opposing transparent substrate having a common electrode 38 thereon, numeral 36 denotes a liquid crystal layer sandwiched by the active matrix substrate and opposing substrate, and numeral 39 denotes a sealing material for sealing the liquid crystal layer.

On the other hand, in case of Method ②, where the liquid crystal panel is fabricated by disconnecting the short-circuit wiring 30 from the signal lines 31 at the connecting portions with a laser beam, besides the signal line 31, the short-circuit remaining line 30' is left of the transparent substrate 32 as shown in the cross section of FIG. 16 after the short-circuit wiring 30 is cut. The short-circuit remaining line 30' thus made disallows the charger 40 to discharge the static electricity directly to the signal line 31 when it comes near or touches the side end surface of the panel. However, the short-circuit remaining line 30' is formed at the nearest position to the side end surface of the panel along the circumference of the panel and the short-circuit remaining line 30' has a floating potential. Thus, the static electricity may be discharged to the signal line 31 formed inside the panel through the short-circuit remaining line 30', thereby causing the element breakdown and hence characteristic defects. Like Method ①, the discharge through the short-circuit remaining line 30' occurs not only when the charger 40 comes near or touches the side end surface of the panel, but also the same comes near the surface of the panel.

The same can be said when the liquid crystal display panel is charged. To be more specific, if a conductive material comes near or touches the side end surface of a charged liquid crystal display panel, the charges are readily discharged to the external conductive material directly from the signal line 31 in case of the one shown in FIG. 15, and from the signal line 31 through the short-circuit remaining line 30' in case of the one shown in FIG. 16. Such discharge to the external conductive material also causes element breakdown and hence characteristic defects.

SUMMARY OF THE INVENTION

It is therefore an object of the present invention to provide an active matrix type liquid crystal display panel and an active matrix type liquid crystal display device using the same, which can prevent static-induced damages to the liquid crystal display panel not only before, but also after cutting a short-circuit wiring provided to prevent these static-induced damages by short-circuiting gate signal lines and source signal lines.

To fulfil the above object, an active matrix type liquid crystal display panel of the present invention provided with:

a dielectric first substrate having a plurality of gate signal lines and a plurality of source signal lines intersecting with each other, and pixel driving elements, provided at intersections of the lines individually, for driving pixels; and a dielectric second substrate provided to oppose the first substrate and having a single film serving as a common electrode, is characterized in that:

(a) conductive guard wiring is formed on the first substrate in a side of an end portion thereof at a predetermined distance from an end portion of at least a part of the gate and source signal lines; and (b) the guard wiring and the common electrode on the second substrate are electrically connected to each other.

According to the above arrangement, the guard wiring is located at the side of substrate end portion (the side end surface of the panel) at a predetermined distance from the end portions of the gate and source signal lines. Thus, when an external charger comes near or touches the side end surface of the panel or the charger touches the surface of the panel and the static electricity is discharged along the surface of the liquid crystal display panel through creeping discharge, the static electricity is not introduced into the gate and source signal lines, but into the guard wiring. Since the guard wiring is electrically connected to the common electrode on the second substrate, the potentials of the common electrode and guard wiring will become equal as soon as the discharge starts. As a result, the gate and source signal lines opposing the common electrode with the liquid crystal layer in between are charged to the same polarity, thereby inhibiting discharge between the guard wiring and the gate and source signal lines.

On the other hand, when the liquid crystal display panel is charged and an external conductive material comes near or touches the side end surface of the panel, the static electricity generated by the charging is discharged to the external conductive material by way of the guard wiring connected to the common electrode. This disables the gate and source signal lines to discharge the static electricity to the external conductive material, either directly or through the guard wiring.

As a result, with the liquid crystal display panel of the present invention, static-induced breakdown of the pixel driving elements and characteristic defects caused by such breakdown can be prevented not only before, but also after cutting the short-circuit wiring provided to prevent static-induced damages to the liquid crystal display panel by short-circuiting the gate and source signal lines, in other words, after the gate signal lines and source signal lines are enabled to operate separately.

Incidentally, as the wiring resistance in the current path from the guard wiring to the common electrode increases, the discharge occurs more frequently between the guard wiring and the nearby gate and source signal lines. Thus, it is necessary to reduce the wiring resistance by, for example, widening the guard wiring. However, a wider guard wiring is not preferable because it requires an additional space in an area other than the effective display area of the liquid crystal display panel. To eliminate this problem, it is preferable that the present invention is arranged in such a manner to connect the guard wiring and common electrode inside the panel. In other words, connecting the guard wiring and common electrode inside the panel can make the wiring distance therebetween relatively short. Thus, if arranged in such a manner, even a narrower guard wiring can maintain a small wiring resistance.

As a result, the guard wiring occupies only a small space on the first substrate at the side of its end portion, and this efficiently reduces an additional space required by the guard wiring in an area other than the effective display area of the liquid crystal display panel.

Also, it is preferable that the present invention is arranged to utilize, as the guard wiring, a short-circuit remaining line left on the first substrate after cutting the short-circuit wiring provided to short-circuit the end portions of the gate and source signal lines. This arrangement can omit the step of forming the guard wiring, thereby reducing the number of the steps in the fabrication sequence. Moreover, an active matrix type liquid crystal display panel of the present invention can be fabricated by utilizing the remaining line of the conventionally used short-circuit wiring, that is, by electrically connecting the short-circuit remaining line on the first substrate and the common electrode on the second substrate.

Further, it is preferable that an active matrix type liquid crystal display device using the above active matrix type liquid crystal display panel is arranged in such a manner that the above guard wiring is electrically connected to the common electrode through a conducting pattern formed on an external circuit connected to the liquid crystal display panel main body. Because, according to this arrangement, electrical connection between the guard wiring on the first substrate and the common electrode on the second substrate is established only by connecting the external circuit to the panel main body, thereby making it possible to design the panel main body more flexibly.

For a fuller understanding of the nature and advantages of the invention, reference should be made to the ensuing detailed description taken in conjunction with the accompanying drawings.

DESCRIPTION OF THE EMBODIMENTS (First Embodiment) Referring to FIGS. 1(a) and 1(b), and FIGS. 2 through 6, the following description will describe a first example embodiment of the present invention.

Figure 1A:
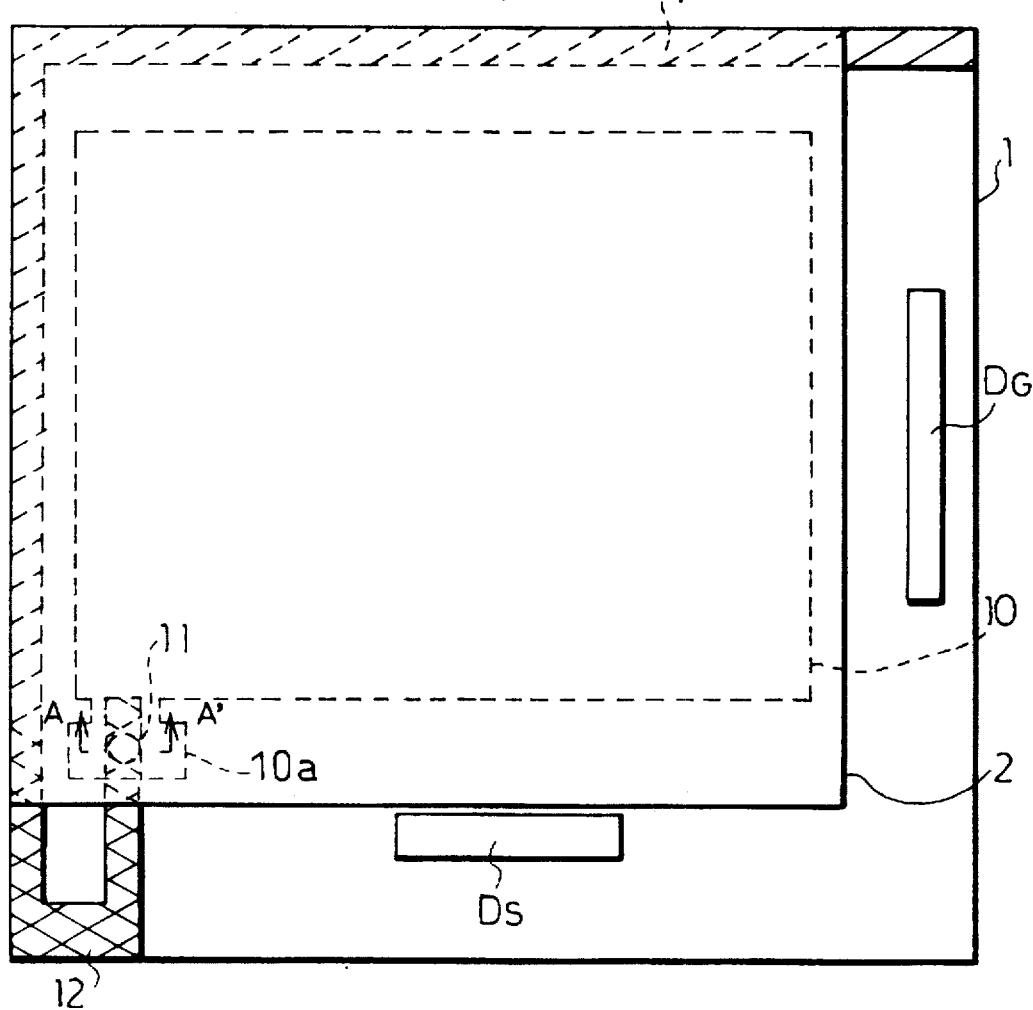
FIG. 1(a) is a plan view of an active matrix type liquid crystal display panel in accordance with a first embodiment of the present invention.
Figure 1B:
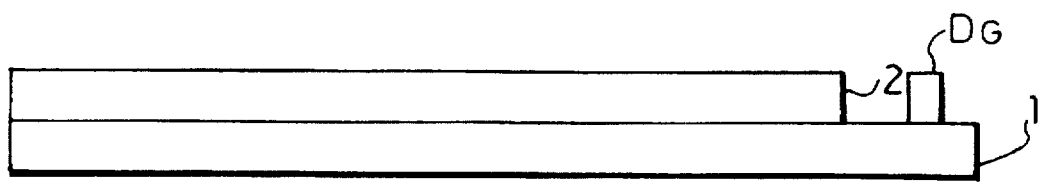
FIG. 1(b) is a front view of the active matrix type liquid crystal display panel of FIG. 1(a)
Figure 2:
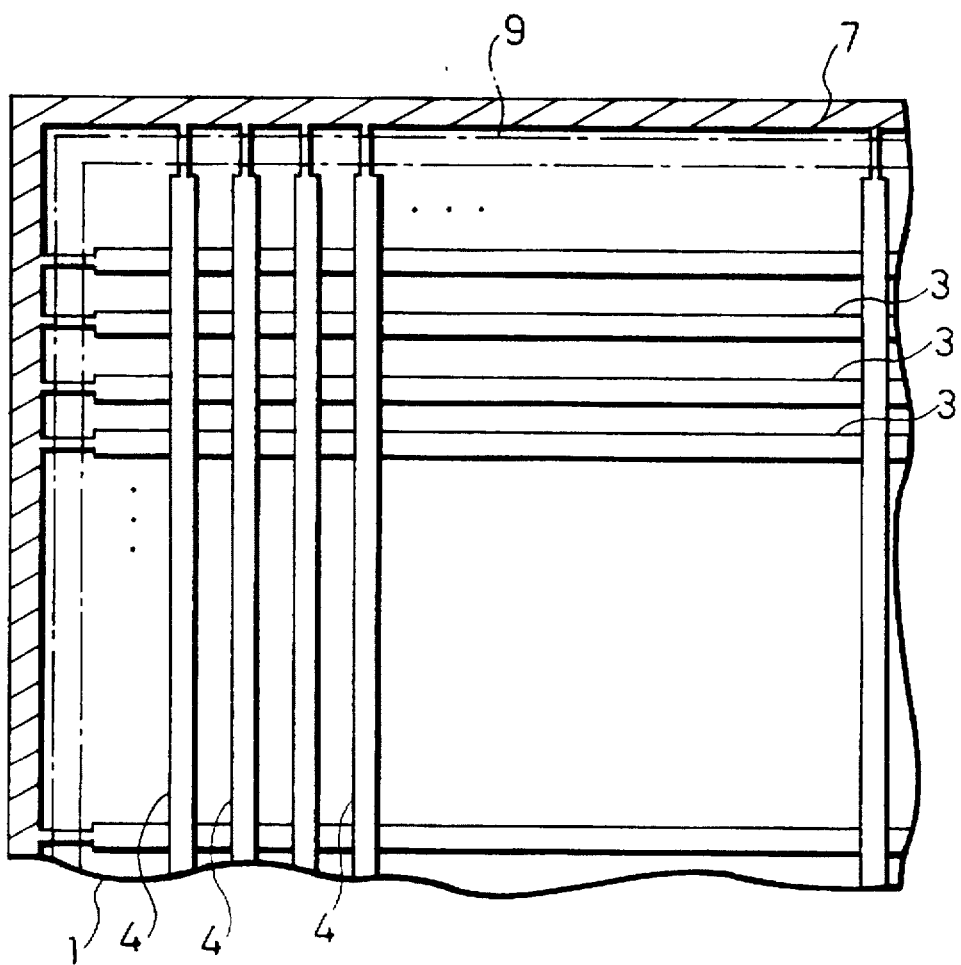
FIG. 2 is a schematic plan view showing a major portion of a first substrate (active matrix substrate) forming the active matrix type liquid crystal display panel of FIG. 1(a)
Figure 3:
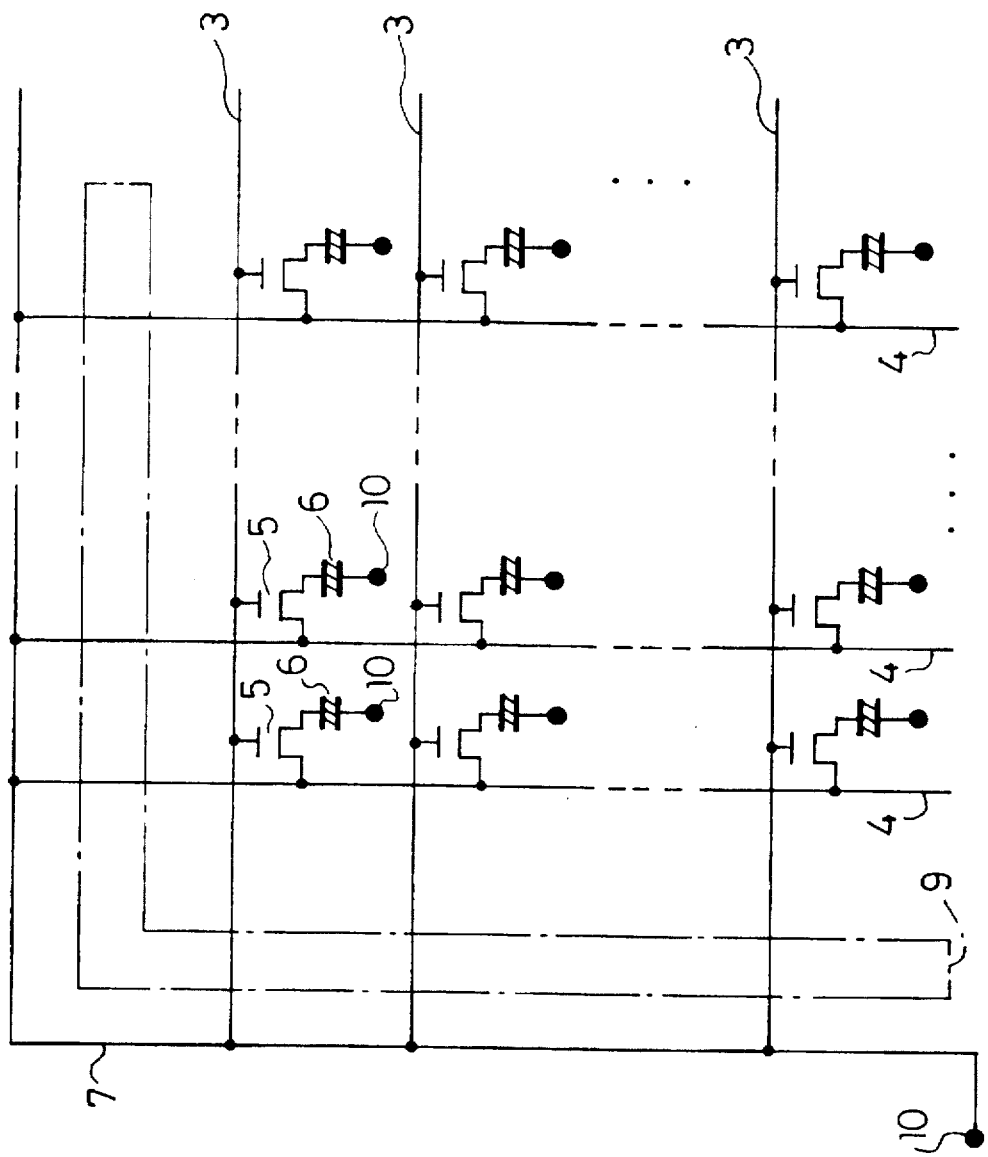
FIG. 3 is an equivalent circuit diagram of the first substrate of FIG. 2.

An active matrix type liquid crystal display panel in accordance with the present embodiment comprises, as shown by a plan view of FIG. 1(a) and a front view of FIG. 1(b), a first substrate 1 and a second substrate 2 opposing each other, and an unillustrated liquid crystal layer sandwiched by these two substrates.

The second substrate 2 is a transparent dielectric substrate made of glass or the like having a single film serving as a common electrode 10 on the surface opposing the first substrate 1. The second substrate 2 serves as the opposing substrate.

The first substrate 1 opposing the second substrate 2 is also a transparent dielectric substrate made of glass or the like. As is shown by a schematic plan view of FIG. 2 or an equivalent circuit diagram of FIG. 3, the first substrate 1 has a plurality of gate signal lines 3 and a plurality of source signal lines 4 intersecting with each other, thin film transistors 5 provided at the intersections of these lines individually to serve as pixel driving elements, and pixel electrodes 6 connected to the matrix wiring through the thin film transistors 5 on the surface opposing the second substrate 2. The first substrate 1 serves as the active matrix substrate.

As shown in FIG. 1(a), a gate driver chip $D_G$ and a source driver chip $D_s$ are formed near the end portions of the first substrate 1, respectively. The gate driver chip $D_G$ and source driver chip $D_s$ are attached onto the first substrate 1 using a COG (Chip On Glass) technique or the like. A short-circuit remaining line 7 (shaded portion in FIGS. 1(a) and 2) is made on the first substrate 1 along the sides opposing the gate driver chip $D_G$ and source driver chip $D_s$. The short-circuit remaining line 7 referred herein is a portion of short-circuit wiring provided to short-circuit the end portions of the gate signal lines 3 and those of the source signal lines 4, which is left on the first substrate 1 after the short-circuit wiring is disconnected from the gate signal lines 3 and source signal lines 4 with a laser beam along an alternate long and short dash line 9 shown in FIGS. 2 and 3. The short-circuit wiring referred herein, as previously mentioned, is provided to short-circuit the end portions of the gate signal lines 3 and those of the source signal lines 4 to prevent the static-induced damages to the liquid crystal display panel, such as the breakdown of the thin film transistors 5 and characteristic defects. The short-circuit wiring is disconnected from these gate signal lines 3 and source signal lines 4 when the liquid crystal display panel is brought into the commercial stage, that is, after the liquid crystal display panel is fabricated by laminating the first substrate 1 and second substrate 2 to each other and sealing the liquid crystal layer in between using a sealing material.

The short-circuit remaining line 7 is made on the first substrate 1 at the side of its end portion at a predetermined distance from the end portions of the gate signal lines 3 and source signal lines 4, and serves as guard wiring in the present invention. The short-circuit remaining line 7 is electrically connected to the common electrode 10 on the second substrate 2. The predetermined distance referred herein means a sufficient distance to electrically isolate the short-circuit remaining line 7 from the gate signal lines 3 and source signal lines 4.

Figure 4:
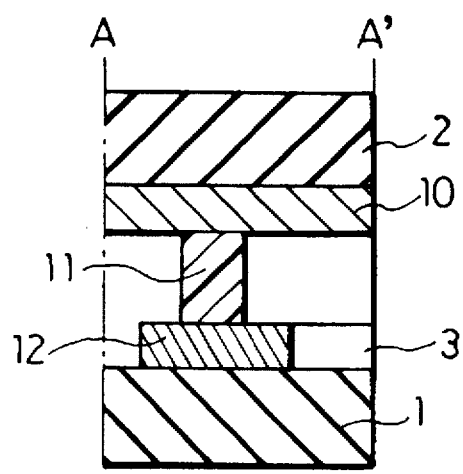
FIG. 4 is a perspective cross section taken on line A-A' of FIG. 1(a)

As shown in FIG. 1(a) and FIG. 4 showing a perspective cross section taken on line A-A' of FIG. 1(a), the electrical connection between the short-circuit remaining line 7 and common electrode 10 is established by connecting a short-circuit wiring terminal 12 (crosshatched portion of FIG. 1(a)) of the short-circuit remaining line 7 to a common terminal 10a of the common electrode 10 on the second substrate 2 through a conductive common transferring material 11 (conductive material) made of silver, carbon paste or the like.

The active matrix type liquid crystal display panel is fabricated by (1) forming short-circuit wiring to interconnect the end portions of the gate signal lines 3 and the source signal lines 4 on the first substrate 1, and (2) electrically connecting the short-circuit wiring to the common electrode 10 on the second substrate 2. After the active matrix type liquid crystal panel is fabricated in the above manner, the short-circuit wiring is disconnected from the gate signal lines 3 and source signal lines 4 by a laser beam, and as a result, the short-circuit remaining line 7 is made. Since the short-circuit wiring and the common electrode 10 are electrically connected before the short-circuit wiring is disconnected by a laser beam, electrical connection is established between the short-circuit remaining line 7 and common electrode 10 as soon as the short-circuit remaining line 7

(guard wiring) is made, or the short-circuit wiring is disconnected from the gate signal lines 3 and source signal lines 4. Therefore, the static-induced damages to the liquid crystal display panel can be prevented not only before, but also after cutting the short-circuit wiring, which will be explained more in detail below.

Figure 5:
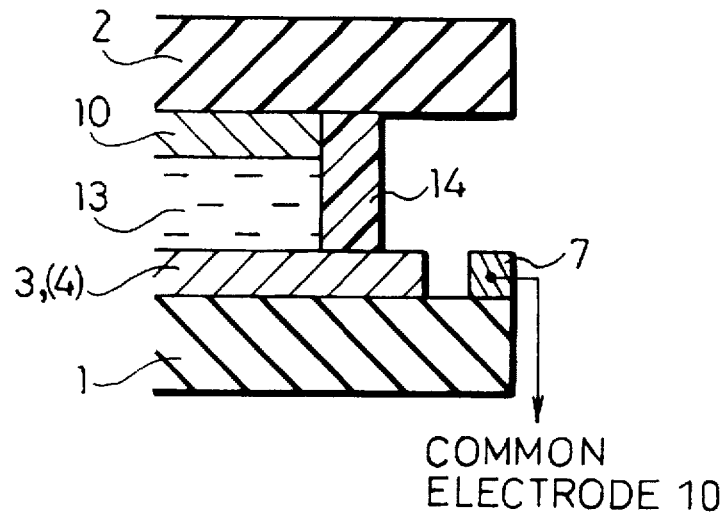
FIG. 5 is a cross section showing a major portion of the active matrix type liquid crystal display panel of FIG. 1(a)

FIG. 5 is a cross section showing a major portion of the present liquid crystal display panel fabricated in the above manner. The short-circuit remaining line 7 is spaced apart from the gate signal lines 3 and source signal lines 4 on the first substrate 1, and the short-circuit remaining line 7 is flush with the side end surface of the panel. As previously mentioned, the short-circuit remaining line 7 on the first substrate 1 is connected to the common electrode 10 formed on the second substrate 2. In FIG. 5, numeral 13 denotes a liquid crystal layer and numeral 14 denotes a sealing material.

Figure 6:
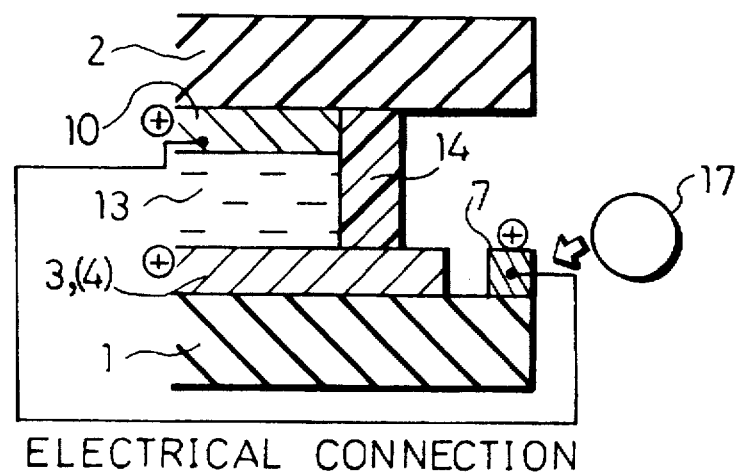
FIG. 6 is a cross section showing a major portion of the active matrix type liquid crystal display panel of FIG. 1(a), and it shows the flow of static electricity when a charger comes near.

With the liquid crystal display panel arranged in the above manner, when a charger 17 comes near or touches the side end surface of the panel as shown in FIG. 6 or the charger 17 touches the surface of the panel and the static electricity is discharged along the surface of the liquid crystal display panel through creeping discharge, the static electricity is initially discharged to the short-circuit remaining line 7 made on the side end surface of the panel. Assume that the short-circuit remaining line 7 is charged to positive (+), then, due to the electrical connection between the short-circuit remaining line 7 and common electrode 10 on the second substrate 2, the potentials of the common electrode 10 and the short-circuit remaining line 7 become equal as soon as the discharge starts. Accordingly, both the gate signal lines 3 and source signal lines 4 opposing the common electrode 10 with the liquid crystal layer 13 in between are charged to the same polarity, positive (+). This inhibits the discharge between the short-circuit remaining line 7 and the gate signal lines 3 and source signal lines 4, thereby preventing the discharge into the panel through the gate signal lines 3 and source signal lines 4.

On the other hand, when the liquid crystal display panel is charged and an external conductive material comes near or touches the side end surface of the panel, the static electricity generated by the charging is discharged to the external conductive material through the short-circuit remaining line 7 connected to the common electrode 10. This disables the gate signal lines 3 and source signal lines 4 to discharge the static electricity to the external conductive material, either directly or through the short-circuit remaining line 7.

As a result, the static-induced breakdown of the thin film transistors 5 and characteristic defects caused by such breakdown can be prevented not only before, but also after the short-circuit wiring, which has been provided to prevent the static-induced damages to the liquid crystal display panel by short-circuiting the gate signal lines 3 and source signal lines 4, is cut at the connecting portions to enable each line to operate individually.

Since the present liquid crystal display panel utilizes the short-circuit remaining line 7 as the guard wiring, the step of forming the guard wiring can be omitted. Moreover, merely utilizing the conventional substrate having the short-circuit wiring thereon as the first substrate 1 and electrically connecting the short-circuit remaining line 7 to the common electrode 10 on the second substrate 2 makes it possible to prevent the static-induced breakdown of the thin film transistors 5 and characteristic defects caused by such breakdown even after the short-circuit wiring is cut.

As mentioned in the above paragraph, the present liquid crystal display panel utilizes the short-circuit remaining line 7 as the guard wiring. Thus, the guard wiring is spaced apart from the end portions of the gate signal lines 3 and source signal lines 4 to provide electrical insulation. However, the arrangement of the short-circuit remaining line 7 is not limited to the above. For example, when a part of the signal lines are extended toward the side end surface of the substrate than the others, the static electricity is readily discharged to these extended signal lines. In this case, the guard wiring may be provided on the end portions of the extended signal lines alone.

Incidentally, the larger the wiring resistance of the current path from the short-circuit remaining line 7 to the common electrode 10 becomes, the more readily the discharge occurs between the short-circuit remaining line 7 and the nearby gate signal lines 3 and source signal lines 4. Thus, it is necessary to reduce the wiring resistance by, for example, widening the short-circuit remaining line 7. In general, however, this is not preferable because a wider short-circuit remaining line 7 requires a larger additional space in an area other than the effective display area of the liquid crystal display panel. This is the reason why the short-circuit remaining line 7 on the first substrate 1 and the common electrode 10 on the second substrate 2 are connected inside the panel in the present liquid crystal display panel. That is to say, connecting the guard wiring and common electrode inside the panel can make the wiring distance therebetween relatively short. Thus, the above arrangement enables a narrower short-circuit remaining line 7 to maintain a small wiring resistance. As a result, the guard wiring (short-circuit remaining line 7 herein) occupies only a small space in the end portion of the first substrate 1, thereby efficiently reducing an additional space in an area other than the effective display area of the liquid crystal display panel.

(Second Embodiment)

Figure 7:
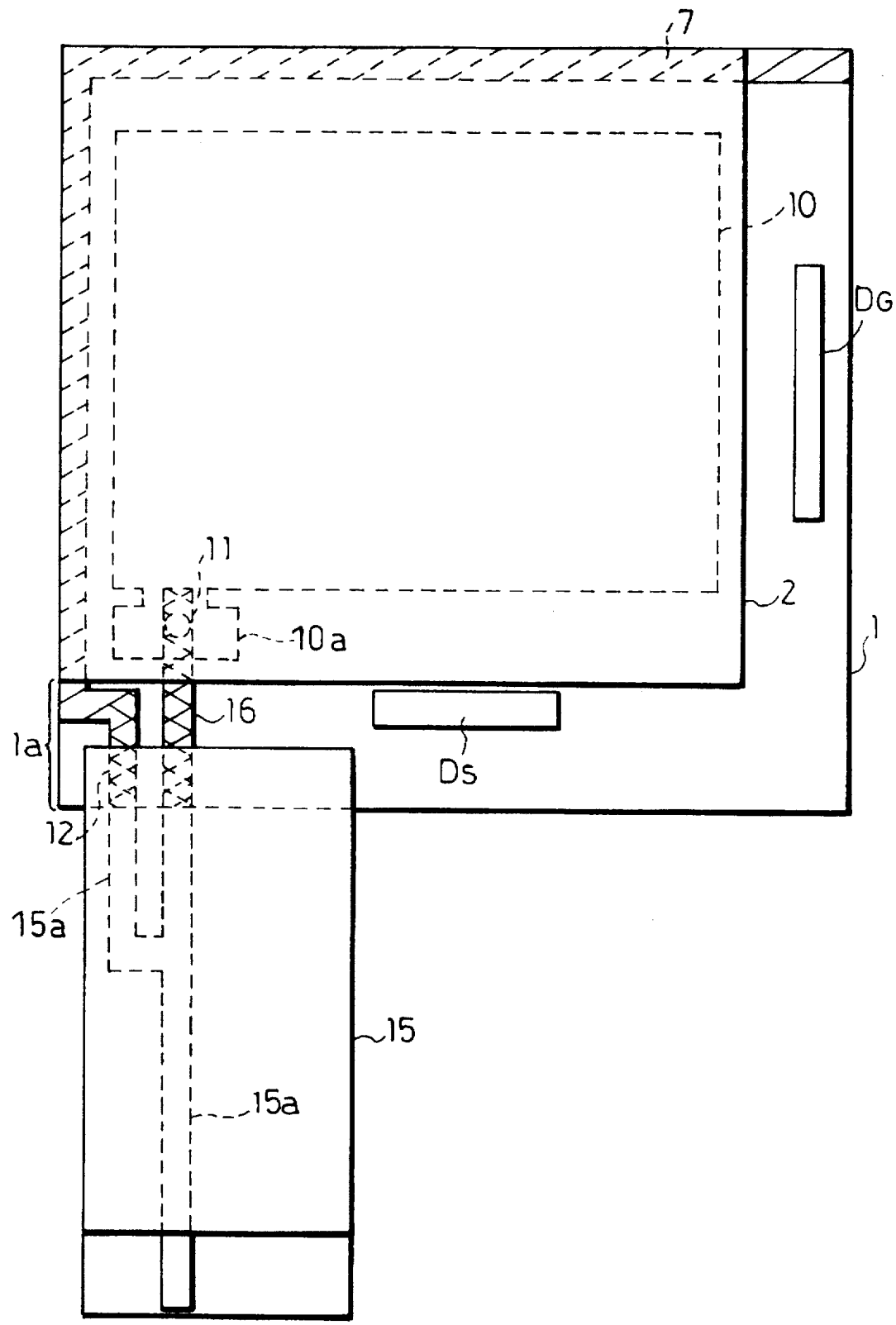
FIG. 7 is a plan view showing an active matrix type liquid crystal display device in accordance with a second embodiment of the present invention, and it shows a connecting method of a short-circuit remaining line on a first substrate and a common electrode of a second substrate.

Referring to FIG. 7, the following description will describe another example embodiment of the preset invention. Hereinafter, like components are labeled with like reference numerals with respect to the first embodiment, and the description of these components is not repeated for the explanation's convenience.

In the active matrix type liquid crystal display panel of the first embodiment, the short-circuit remaining line 7 on the first substrate 1 and the common electrode 10 of the second substrate 2 are electrically connected to each other inside the panel. In contrast, in an active matrix type liquid crystal display device of the present embodiment, the electrical connection between the short-circuit remaining line 7 on the first substrate 1 and the common electrode 10 of the second substrate 2 is established by connecting an external circuit including a wiring substrate to the panel main body and incorporating the same as an integral component. The rest of the structure is identical with the counterpart in the first embodiment, and the description of the same is not repeated for the explanation's convenience.

The above external circuit includes a wiring substrate directly connected to the panel main body and an external circuit substrate connected to the panel main body through the wiring substrate As shown in FIG. 7, the electrical connection between the short-circuit remaining line 7 on the first substrate 1 and the common electrode 10 on the second substrate 2 of the liquid crystal display panel is established by a film connecter 15 (wiring substrate) made of a flexible circuit substrate or the like for connecting the first substrate 1 to an unillustrated external circuit substrate. A common electrode terminal 16 (transferring terminal of the common electrode) is formed at a substrate terminal portion 1a of the first substrate 1. The common electrode terminal 16, which is indicated by a crosshatched portion in FIG. 7, is connected to a common terminal 10a of the common electrode 10 on the second substrate 2 through a common transferring material 11. Also, a short-circuit wiring terminal 12 (another crosshatched portion in FIG. 7) is formed at the substrate terminal portion 1a of the first substrate 1 in such a manner to be connected to the short-circuit remaining line 7. The electrical connection between the common electrode terminal 16 and short-circuit wiring terminal 12 both on the first substrate 1 is established through a conducting portion 15a (conducting pattern) formed on the film connecter 15 when the film connector 15 is connected to the first substrate 1.

Alternatively, the short-circuit wiring terminal 12 and the common electrode terminal 16 both on the first substrate 1 may be connected on an external circuit substrate connected to the first substrate 1 through a wiring substrate made of a flexible circuit substrate or the like. An example arrangement for establishing electrical connection between the short-circuit remaining line 7 and common electrode 10 on the external circuit substrate will be explained in the third embodiment below.

As has been explained, the short-circuit remaining line 7 and common electrode 10 are electrically connected through the external circuit including the wiring substrate connected to the liquid crystal display panel in the present embodiment. Thus, the liquid crystal display panel can be designed more flexibly compared with the counterpart in the first embodiment in which the short-circuit remaining line 7 and common electrode 10 are electrically connected inside the panel.

Here, a sample is made in the manner shown in FIG. 7 where the short-circuit remaining line 7 and common electrode 10 are connected to each other through the film connector 15, and tests are run to check withstand electrostatic voltage and conforming ratio of a liquid crystal module assembled with the sample.

The test measuring the withstand electrostatic voltage is carried out under two conditions:

(A) a liquid crystal display device alone; and (B) a liquid crystal display device in a general condition, that is, a liquid crystal display device covered with a conductive shield case made of a galvanized steel sheet or the like except for the display area.

In the test finding the conforming ratio, any liquid crystal module having no static-induced defect is assumed as being defectless, and any liquid crystal module having one or more than one damaged thin film transistor 5 is assumed as being defective. A liquid crystal display device whose short-circuit remaining line 7 and common electrode 10 are not connected (conventional liquid crystal display device) is also assembled as a comparative sample, and the tests are run in the same manner.

The wiring condition of the short-circuit remaining line 7 used in the tests are as follows:

distance between short-circuit remaining line 7 and signal: 100 μm or more lines 3 and 4 to provide electrical isolation width of short-circuit remaining: 135 μm line 7 thickness of short-circuit: 1300 Å remaining line 7

The withstand electrostatic voltage and conforming ratio thus found are set forth in TABLE's 1 and 2 below, respectively.

TABLE 1

| TESTING SAMPLE | | WITHSTAND ELECTROSTATIC VOLTAGE |
|---|---|---|
| PRESENT EMBODIMENT | CONDITION (A) | +19.0 Kv |
| | CONDITION (B) | +17.0 Kv |
| COMPARATIVE SAMPLE | CONDITION (A) | +10.0 Kv |
| | CONDITION (B) | +7.0 Kv |

TABLE 2

| SAMPLE INCORPORATED INTO MODULE | CONFORMING RATIO |
|---|---|
| PRESENT EMBODIMENT | APPROXIMATELY 88% |
| COMPARATIVE SAMPLE | APPROXIMATELY 76% |

TABLE 1 reveals that the electrostatic resistance of the sample in accordance with the present invention is increased double-fold compared with the comparative sample under the condition (A), and by a factor of 2.5 under the condition (B). Thus, it is understood that the liquid crystal display device (liquid crystal display panel) in accordance with the present invention hardly introduces static electricity inside the panel even when a conductive material, such as a shield case, is provided around the circumference of the panel main body (in other words, under any condition).

Also, TABLE 2 reveals that the defective ratio (approximately 12%) of the module incorporating the sample in accordance with the present invention is reduced by half compared with the defective ratio (approximately 24%) of the module incorporating the comparative sample. Thus, it is clearly understood that using the sample in accordance with the present invention can drastically increase the conforming ratio of the resulting liquid crystal module.

(Third Embodiment)

Figure 8:
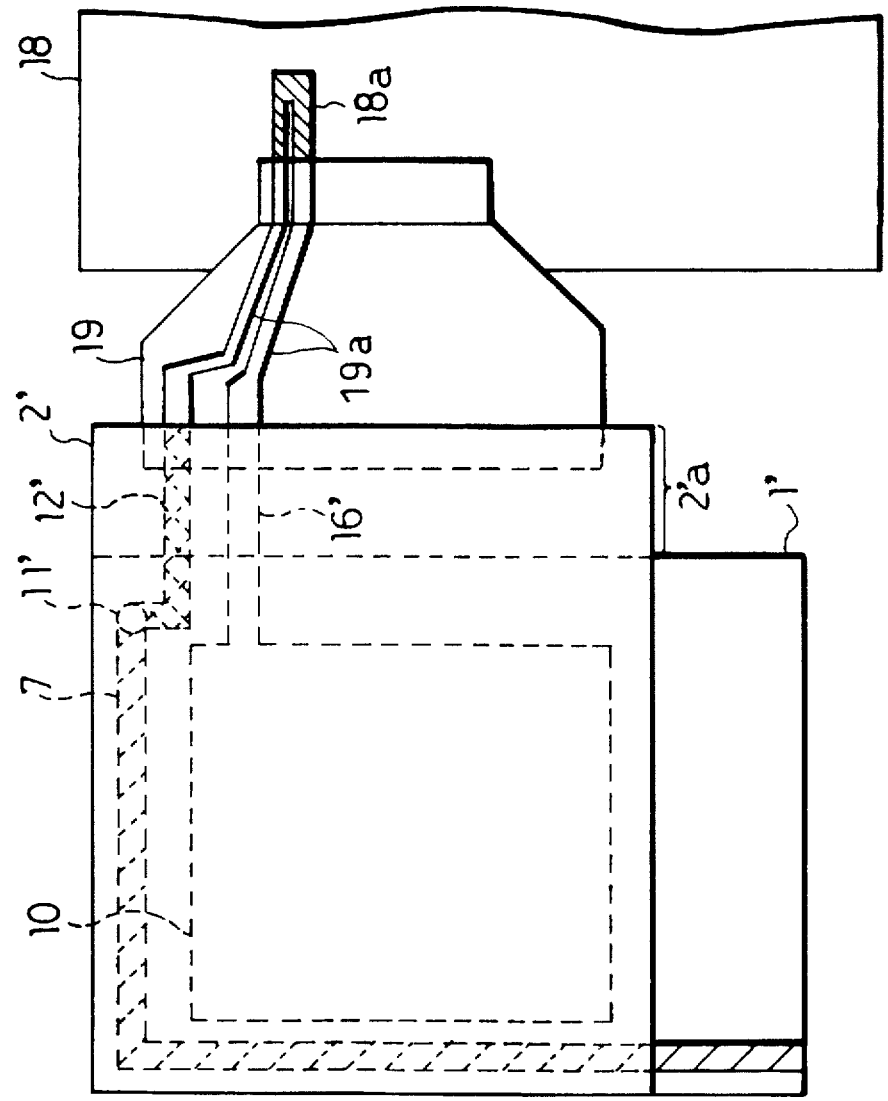
FIG. 8 is a view explaining a connecting method of a short-circuit remaining line on a first substrate and a common electrode of a second substrate in an active matrix type liquid crystal display device in accordance with a third embodiment of the present invention.
Figure 9A:
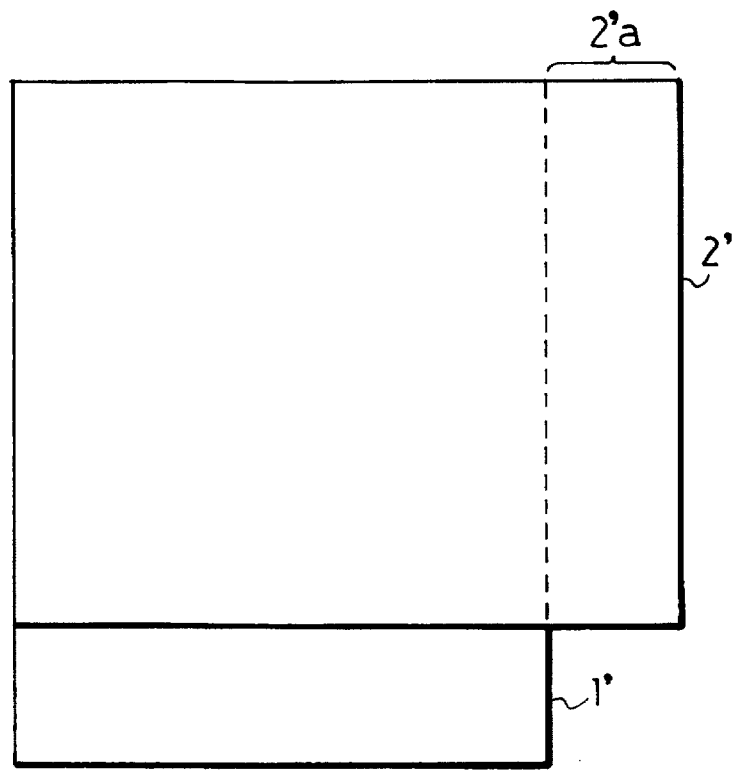
FIG. 9(a) is a plan view of an active matrix type liquid crystal display panel forming the active matrix type liquid crystal display device of FIG. 8.
Figure 9B:
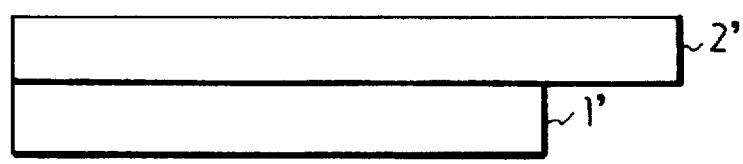
FIG. 9(b) is a front view of the active matrix type liquid crystal display panel of FIG. 9(a)
Figure 10:
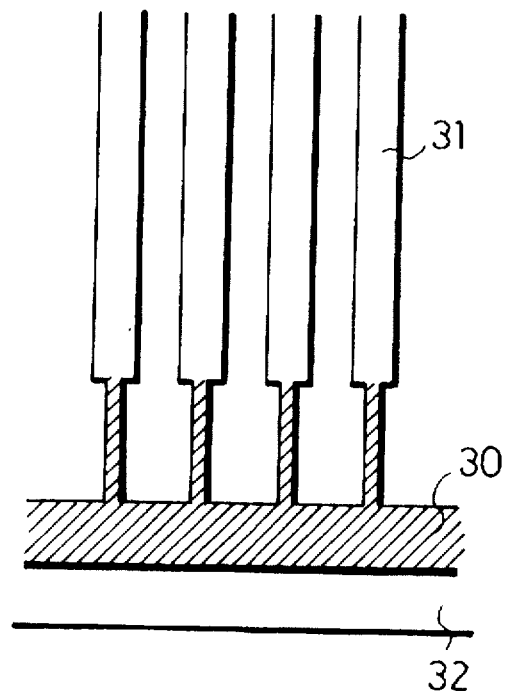
FIG. 10 is a view explaining an example of conventional short-circuit wiring provided on an active matrix substrate.
Figure 11:
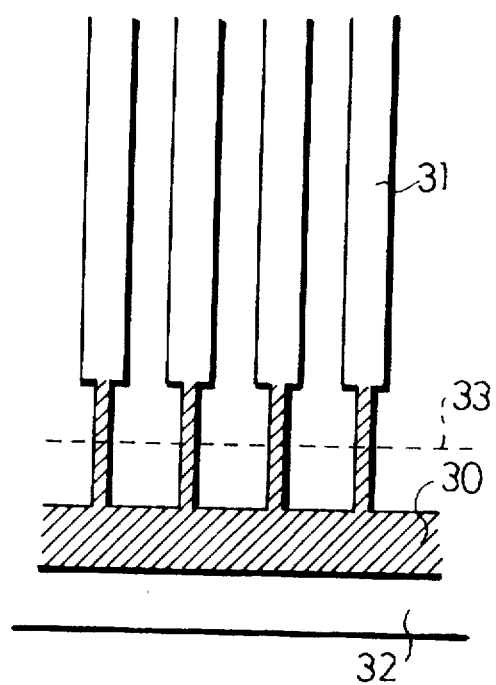
FIG. 11 is a view explaining a cutting portion when the substrate and short-circuit wiring are cut off together with the active matrix substrate of FIG. 10.
Figure 12:
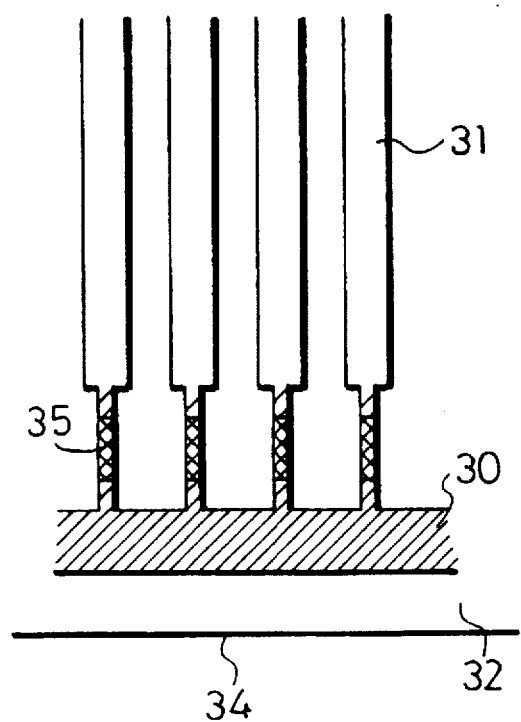
FIG. 12 is a view explaining a cutting portion when the short-circuit wiring on the active matrix substrate of FIG. 10 is cut by a laser beam.
Figure 13:
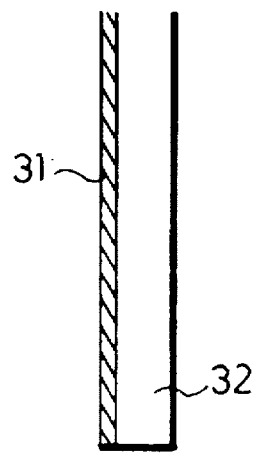
FIG. 13 is a side view of the active matrix substrate after the short-circuit wiring is cut along the cutting portion shown in FIG. 11.
Figure 14:
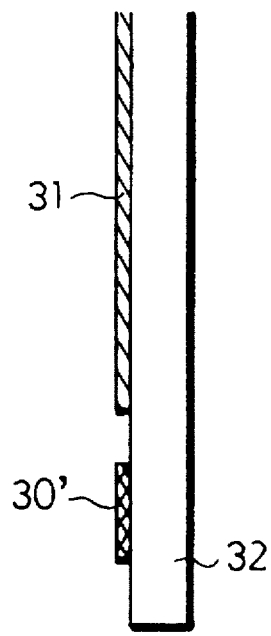
FIG. 14 is a side view of the active matrix substrate after the short-circuit wiring is cut along the cutting portion shown in FIG. 12.
Figure 15:
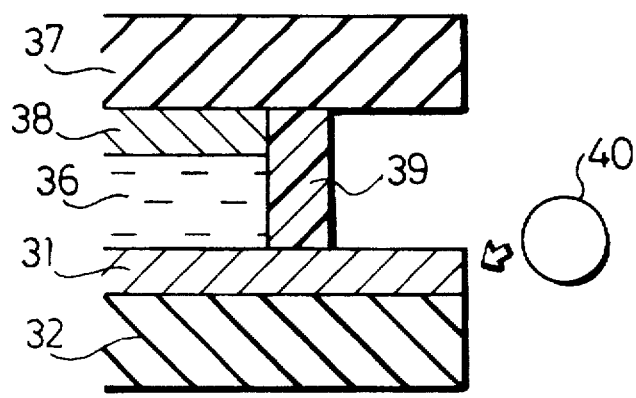
FIG. 15 is a cross section of a major portion of the active matrix substrate of FIG. 11.
Figure 16:
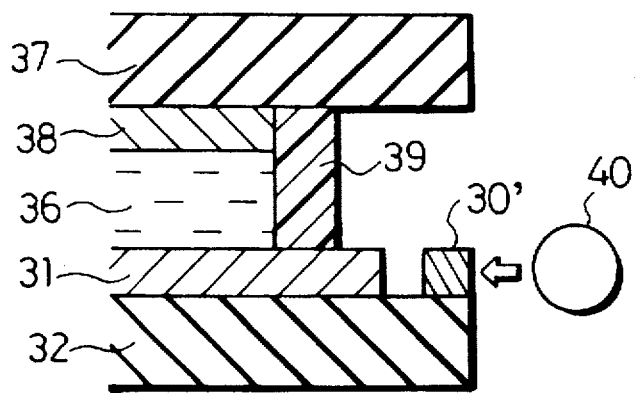
FIG. 16 is a cross section of a major portion of the active matrix substrate of FIG. 12.

Referring to FIGS. 8, 9(a), and 9(b), the following description will describe a further example embodiment of the present invention. Hereinafter, like components are labeled with like reference numerals with respect to the above embodiments, and the description of these components is not repeated for the explanation's convenience.

In the active matrix type liquid crystal display device of the second embodiment, the short-circuit remaining line 7 and common electrode 10 are connected to each other through the film connector 15 connected to the first substrate 1 of the panel main body. In contrast, in an active matrix type liquid crystal display device of the present embodiment, as shown by a plan view of the panel main body of FIG. 9(a) and a front view of the same of FIG. 9(b), a substrate terminal portion 2'a is additionally provided to a second substrate 2'. As shown in FIG. 8, the short-circuit remaining line 7 on a first substrate 1' and the common electrode 10 on the second substrate 2' are electrically connected to each other through an external circuit including a wiring substrate connected to the second substrate 2'.

To be more specific, a short-circuit wiring terminal 12' (transferring terminal of the guard wiring), which is indicated by a crosshatched portion in FIG. 8, is formed at the substrate terminal portion 2'a of the second substrate 2' and connected to either end of the short-circuit remaining line 7 on the first substrate 1' through a transferring material 11'. The transferring material 11' is made of, for example, silver and carbon paste. Further, a common electrode terminal 16' of the common electrode 10 is formed on the substrate terminal 2a'. The common electrode terminal 16' and short-circuit wiring terminal 12' are connected to each other when the second substrate 2' is connected to a TCP (Tape Carrier Package) 19 (wiring substrate) to which an external circuit substrate 18 is soldered. To be more specific, two conducting portions 19a (first conducting pattern), which are respectively connected to the common electrode terminal 16' and short-circuit wiring terminal 12', are formed on the TCP 19. On the other hand, a conducting portion 18a (second conducting pattern), which is indicated by a shaded portion in FIG. 8, is formed on the external circuit substrate 18 to short-circuit the above two conducting portions 19a on the TCP 19. Thus, the common electrode terminal 16' and short-circuit wiring terminal 12' are connected to each other through the two conducting portions 19a on the TCP 19 and the conducting portion 18a on the external circuit substrate 18 when the TCP 19 is connected to the second substrate 2'.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix type liquid crystal display panel comprising:

a dielectric first substrate, said first substrate including a plurality of gate signal lines and a plurality of source signal lines intersecting with each other, and pixel driving elements, provided at intersections of said lines individually, for driving pixels;

a liquid crystal layer;

a dielectric second substrate provided to oppose said first substrate with said liquid crystal layer inbetween, said second substrate including a single film serving as a common electrode; and conductive guard wiring formed on said first substrate in a side of an end portion thereof at a predetermined distance form an end portion of at least a part of said gate and source signal lines, said guard wiring being electrically isolated from said gate signal lines and said source signal lines, said guard wiring and said common electrode on said second substrate being electrically connected to each other.

2. The active matrix type liquid crystal display panel as defined in claim 1, wherein said guard wiring is a short-circuit remaining line left on said first substrate after cutting connection between said gate and source signal lines and a short-circuit wiring provided to short-circuit end portions of said gate and source signal lines.

3. The active matrix type liquid crystal display panel as defined in claim 1, wherein said guard wiring is formed along said end portion of said first substrate.

4. The active matrix type liquid crystal display panel as defined in claim 1 further comprising:

a gate driver, provided near a first side of the end portion of said first substrate, for driving said each gate signal line; and a source driver, provided near a second side of the end portion of said first substrate, for driving said each source signal line, neither said gate driver nor source driver being provided on said end portion of said first substrate along which said guard wiring is formed.

5. The active matrix type liquid crystal display panel as defined in claim 1 further comprising:

a first terminal of said guard wiring, provided on said first substrate, for establishing electrical connection with said common electrode;

a second terminal of said common electrode, provided on said second substrate, for establishing electrical connection with said guard wiring; and a conductive material, provided between said first and second terminals, for electrically connecting said two terminals.

6. The active matrix type liquid crystal display device as defined in claim 1 further comprising an external circuit connected to a main body of said liquid crystal display panel, wherein said guard wiring is electrically connected to said common electrode through a conducting pattern formed on said external circuit.

7. The active matrix type liquid crystal display device as defined in claim 6, wherein said guard wiring is a short-circuit remaining line left on said first substrate after cutting connection between said gate and source signal lines and a short-circuit wiring provided to short-circuit end portions of said gate and source signal lines.

8. The active matrix type liquid crystal display device as defined in claim 6, wherein said external circuit includes:

a wiring substrate directly connected to the main body of said liquid crystal display panel; and an external circuit substrate connected to the main body of said liquid crystal display panel through said wiring substrate, wherein said guard wiring is electrically connected to said common electrode through a conducting pattern formed on said wiring substrate.

9. The active matrix type liquid crystal display device as defined in claim 6, wherein said external circuit includes:

a wiring substrate directly connected to the main body of said liquid crystal display panel; and an external circuit substrate connected to the main body of said liquid crystal display panel through said wiring substrate, wherein said guard wiring is electrically connected to said common electrode through a first conducting pattern formed on said wiring substrate and a second conducting pattern formed on said external circuit substrate.

10. The active matrix type liquid crystal display device as defined in claim 6 further comprising:

a first terminal of said guard wiring, provided on said first substrate, for establishing electrical connection with said common electrode;

a second terminal of said common electrode, provided on said second substrate, for establishing electrical connection with said guard wiring;

a transferring material for transferring said second terminal on said second substrate to said first substrate, said transferring material being connected to said second terminal at either end while being extended toward said first substrate at the other end; and a transferring terminal of said common electrode connected to said transferring material on said first substrate, wherein said first terminal and said transferring terminal of said common electrode are connected to each other through a conducting pattern formed on said external circuit connected to said first substrate.

11. The active matrix type liquid crystal display device as defined in claim 6 further comprising:
- a first terminal of said common electrode, provided on said second substrate, for establishing electrical connection with said guard wiring;
- a conductive transferring material for transferring a part of said guard wiring on said first substrate to said second substrate, said transferring material being connected to a part of said guard wiring at either end while being extended toward said second substrate at the other end; and
- a transferring terminal of said guard wiring connected to said transferring material on said second substrate, wherein said first terminal and said transferring terminal of said guard wiring are connected to each other through a conducting pattern formed on said external circuit connected to said second substrate.

12. An active matrix type liquid crystal display panel comprising:
- a dielectric first substrate, said first substrate including a plurality of gate signal lines and a plurality of source signal lines intersecting with each other, and pixel driving elements, provided at intersections of said lines individually, for driving pixels;
- a liquid crystal layer;
- a dielectric second substrate provided to oppose said first substrate with said liquid crystal layer inbetween, said second substrate including a single film serving as a common electrode;
- conductive guard wiring formed on said first substrate in a side of an end portion thereof at a predetermined distance form an end portion of at least a part of said gate and source signal lines; and
- an external circuit connected to a main body of said liquid crystal display panel, wherein said guard wiring is electrically connected to said common electrode through a conducting pattern formed on said external circuit.

13. The active matrix type liquid crystal display device as defined in claim 12, wherein said guard wiring is a short-circuit remaining line left on said first substrate after cutting connection between said gate and source signal lines and a short-circuit wiring provided to short-circuit end portions of said gate and source signal lines.

14. The active matrix type liquid crystal display device as defined in claim 12, wherein said external circuit includes:
- a wiring substrate directly connected to the main body of said liquid crystal display panel; and
- an external circuit substrate connected to the main body of said liquid crystal display panel through said wiring substrate, wherein said guard wiring is electrically connected to said common electrode through a conducting pattern formed on said wiring substrate.

15. The active matrix type liquid crystal display device as defined in claim 12, wherein said external circuit includes:
- a wiring substrate directly connected to the main body of said liquid crystal display panel; and
- an external circuit substrate connected to the main body of said liquid crystal display panel through said wiring substrate, wherein said guard wiring is electrically connected to said common electrode through a first conducting pattern formed on said wiring substrate and a second conducting pattern formed on said external circuit substrate.

16. The active matrix type liquid crystal display device as defined in claim 12 further comprising:
- a first terminal of said guard wiring, provided on said first substrate, for establishing electrical connection with said common electrode;
- a second terminal of said common electrode, provided on said second substrate, for establishing electrical connection with said guard wiring;
- a transferring material for transferring said second terminal on said second substrate to said first substrate, said transferring material being connected to said second terminal at either end while being extended toward said first substrate at the other end; and
- a transferring terminal of said common electrode connected to said transferring material on said first substrate, wherein said first terminal and said transferring terminal of said common electrode are connected to each other through a conducting pattern formed on said external circuit connected to said first substrate.

17. The active matrix type liquid crystal display device as defined in claim 12 further comprising:
- a first terminal of said common electrode, provided on said second substrate, for establishing electrical connection with said guard wiring;
- a conductive transferring material for transferring a part of said guard wiring on said first substrate to said second substrate, said transferring material being connected to a part of said guard wiring at either end while being extended toward said second substrate at the other end; and
- a transferring terminal of said guard wiring connected to said transferring material on said second substrate, wherein said first terminal and said transferring terminal of said guard wiring are connected to each other through a conducting pattern formed on said external circuit connected to said second substrate.

* * * * *